United States Patent [19]

Rice

[11] Patent Number: 4,960,816

[45] Date of Patent: * Oct. 2, 1990

[54] SURFACE MODIFIED MINERAL COMPOSITIONS

[75] Inventor: Camilla A. Rice, Sandersville, Ga.

[73] Assignee: ECC America Inc., Atlanta, Ga.

[*] Notice: The portion of the term of this patent subsequent to Dec. 6, 2005 has been disclaimed.

[21] Appl. No.: 279,210

[22] Filed: Dec. 2, 1988

Related U.S. Application Data

[63] Continuation-in-part of Ser. No. 881,320, Jul. 22, 1986, abandoned, and a continuation-in-part of Ser. No. 943,669, Dec. 17, 1986, Pat. No. 4,789,403, and a continuation-in-part of Ser. No. 175,868, Mar. 31, 1988, Pat. No. 4,859,718, and a continuation-in-part of Ser. No. 263,689, Oct. 28, 1988, Pat. No. 4,900,767.

[51] Int. Cl.$^5$ .................... B32B 17/02; B32B 19/00; C08K 9/04; C08K 3/34; C08K 3/26

[52] U.S. Cl. .................... 524/425; 106/415; 106/416; 106/417; 106/465; 106/489; 428/404; 428/406; 428/407; 523/202; 523/205; 523/209; 524/447; 524/449; 524/451; 524/456

[58] Field of Search .................... 523/205, 209, 202; 528/404, 406, 407; 106/415, 416, 417, 465, 489; 524/456, 451, 449, 447, 425

[56] References Cited

U.S. PATENT DOCUMENTS 4,789,403 12/1988 Rice .................... 524/445
4,859,718 8/1989 Rice .................... 523/202

Primary Examiner—Lewis T. Jacobs
Attorney, Agent, or Firm—Klauber & Jackson

[57] ABSTRACT

A mineral particulate is disclosed selected from the group consisting of metal carbonates, glass fibers and layered lattice silicates, comprising particles of said mineral, the surface of which have been modified by a polymer synthesized in situ in the presence of a reactive gas selected from the group consisting of hydrogen, carbon monoxide and carbon dioxide; said particulate having a predetermined particle size distribution which substantially corresponds to the particle size distribution of the surface-unmodified feed particulate from which the product particulate is produced.

31 Claims, 9 Drawing Sheets

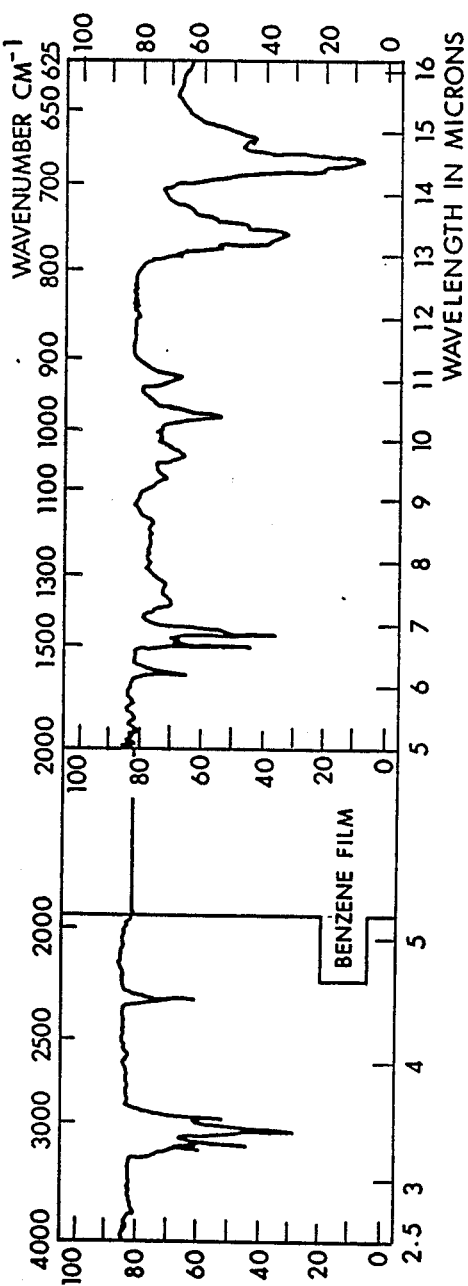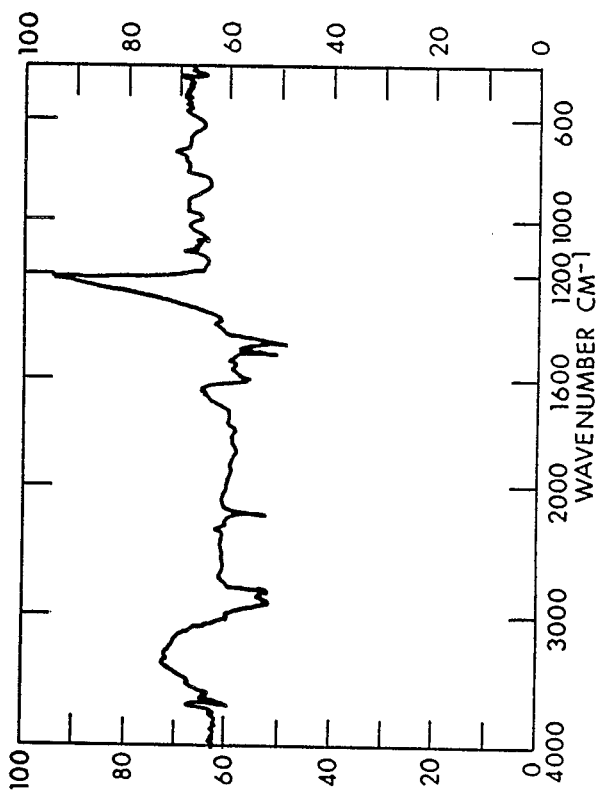
FIG. 7
FIG. 8

SURFACE MODIFIED MINERAL COMPOSITIONS

RELATED APPLICATION

This application is a continuation-in-part of U.S. Ser. No. 887,320 filed on July 22, 1986, abandoned, and a C-I-P of U.S. Ser. No. 943.669 filed on Dec. 17, 1986, now Pat. No. 4,789,403, issued Dec. 1988, and act of U.S. Ser. No. 175,868 filed on Mar. 31, 1988, now Pat. No. 4,859,718, issued Aug. 22, 1989, and a C-I-P of U.S. Ser. No. 263,689, filed on Oct. 28, 1988, now Pat. No. 4,900,767, issued Feb. 13, 1990.

FIELD OF THE INVENTION

This invention relates generally to minerals, e.g., inorganic substances, including siliceous minerals such as aluminosilicates and the like, and more specifically relates to a method for producing a layered lattice silicate which is surface modified with an organic material. The products comprise particles of the layered lattice silicate, the surfaces of which are modified by a polymer.

BACKGROUND OF THE INVENTION

The layered silicates to which (in part) the invention is applicable are of the type which can be represented by the general formula $E_i M_x Si_y O_n (OH)_m$ where M is Al, Mg, or Fe, $x=2$ to 6; $y=2$ to 8, $n=2$ to 20, $m=0$ to 8, and $E_i$ is one or more exchangeable ions (K, Na, Mg, Ca, Ba, Fe, Li etc.) These layered silicates will hereinafter in this specification be referred to as "layered lattice silicates".

In the instance of layered lattice silicates such as kaolin clays, it has long been recognized that products having new properties and uses could be formulated by combining these aluminosilicates with organic materials. However, useful progress in this direction has tended to be limited by the lack of available covalent bonding at the mineral/organic interface. In the past this difficulty has been partially overcome by surface modification of the kaolinite through coupling with organosilane compounds, and subsequent reaction between dependent silanes and organics.

Thus, in Papalos, U.S. Pat. No. 3,227,675, for example, kaolin clays are described, the surfaces of which are modified with organofunctional silanes. A typical such agent, e.g., is a methacryloxypropyltrimethoxy silane. The kaolin clays so modified are advantageously used as fillers for natural and synthetic rubbers and the like. It is also pointed out in this patent that such modified products can serve as intermediates for synthesis of new pigments, which are useful as fillers for polymers, elastomers and resins. This result obtains because the silanes used to modify the kaolin clays are di- or polyfunctional, and only one functional group, the silane, is attached to the clay, leaving the remaining reactive groups to react further.

Additional references of this type include Iannicelli U.S. Pat. No. 3,290,165, and Iannicelli, U.S. Pat. No. 3,567,680.

However, the modification of aluminosilicates such as kaolin clays by the use of organosilanes, is a complicated and expensive process. Among other things, the cost of the organosilane itself is very high. Furthermore, the resulting products have only limited capability for further reaction, regardless of the particular organosilanes utilized. Also, when used in perhaps the most common application, i.e. as fillers in polymer systems, the limited number of available structures tends to impose limitations on the compatibility of such organosilane-modified pigments with various polymer matrices.

U.S. Pat. No. 3,397,171 describes a process for the production of polyamide textile fibers in which a small percentage of a kaolinite is added to polycarbonamide-forming reagents plus a deflocculant and the mixture is then polymerized. It is mentioned, however, that microscopic inspection reveals that each kaolinite platelet is surrounded by an elongated void where the polymer has separated from the particle, so that evidently no bonding has occurred by use of this process.

In U.S. Pat. No. 3,912,532 particles of a clay such as kaolin are coated with a urea-formaldehyde resin by dispersing the clay particles in an aqueous solution of a prepolymer of urea-formaldehyde and then polymerizing the latter. The products are used as opacifying agents for paper.

U.S. Pat. No. 4,230,501 describes compositions of pigments such as carbon black mixed with a combination of waxy materials and wax-like materials. The products are said to be dispersible in plastics.

According to U.S. Pat. No. 4,091,164, normally hydrophilic inorganic fillers such as kaolin clays are modified to enhance their dispersibility in polymeric resins by admixing filler particles with a block copolymer of ethylene oxide and propylene oxide under shear and at elevated temperature to coat the filler particles with the block copolymer.

In U.S. Pat. No. 4,349,389 an inorganic pigment such as titanium dioxide, suitably as an aqueous slurry, is coated with a substance which renders the surface hydrophobic, such as dispersing agents of the type of alkylbenzene sulfonic acids, and then with a thermoplastic polymer which may be used as a mixture with an emulsifying agent. The products are said to be dispersible in thermoplastics and paints.

U.S. Pat. No.3,573,944 describes a process of forming organophilic particles from a clay such as kaolin, by heating to drive off bound water, cooling, adding a solution in a petroleum ether solvent of an alkylene divinyl ether and polymerizing said ether while refluxing the solvent.

U.S. Pat. No. 3,901,845 describes filled and reinforced polyamide (e.g. nylon 6 or nylon 6,6) compositions in which a mineral filler such as silica is chemically coupled to the polymer matrix by an aromatic compound having a carboxyl group and a hydroxyl or amine group.

U.S. Pat. No. 4,472,538 discloses a composite material prepared by contacting a clay mineral having laminated aluminum silicate layers with an organic monomer to allow the organic monomer to be adsorbed on or intercalated between the aluminum silicate layers, and contacting the clay mineral with a silane compound having 2 to 4 chlorine atoms to promote polymerization of the organic monomer.

U.S. Pat. No. 3,773,708 discloses a method for forming a filler composition by crushing an inorganic filler wherein the filler is reduced in size by an average of more than 10 time the original diameter in the presence of a free radical polymerizable or ionic polymerizable monomer whereby the monomer is polymerized and is bonded to the newly formed surfaces of the crushed filler to form a modified filler, whereby said bonding is free radical bonding when said monomer is a free radical polymerizable monomer and is ionic bonding when said monomer is an ionic polymerizable monomer.

In accordance with the foregoing, it may be regarded as an object of the present invention, to provide new types of surface modified minerals such as layered lattice silicate pigments, which are totally and directly compatible with the polymer systems to which they may be added as fillers, and which when so used provide outstanding improvements in the mechanical and other useful properties of the filled system.

It is also an object of the invention to provide a method of surface modification of layered lattice silicates in which improved bonding of modifier to the silicate surface is achieved.

It is a further object of the invention to provide a relatively simple, and effective process, for preparing the aforementioned surface modified pigments from layered lattice silicates, such as aluminosilicates, and which enables preparation of such products with a wide variety of compatibility characteristics for use in desired polymer matrices.

SUMMARY OF THE INVENTION

Now in accordance with the present invention, the foregoing objects, and others as will become apparent in the course of the ensuing specification, are achieved in a method of treating a mineral selected from the group consisting of metal carbonates, glass fibers and layered lattice silicates so that they become surface modified with an organic material. The metal carbonate may be selected from the group consisting of calcium carbonate, magnesium carbonate and calcium-magnesium carbonate. According to the invention, the mineral which is in substantially dry particulate form, is contacted with an organic monomer, comonomers, or a prepolymer, viz., not fully polymerized to its highest molecular weight range, and surface polymerization or reaction is effected in the presence of a gas selected from the group consisting of $H_2$, $CO$ and $CO_2$. Mixtures of these gases may also be used, e.g., "synthesis gas" which is a mixture of $H_2$ and $CO$. The level of addition of the monomers/prepolymers may suitably be in the range of about 0.20 weight percent to about 10 weight percent based on the weight of the mineral. The starting material, i.e., the layered lattice silicate, or other mineral, such as a refined kaolin, talc, or $CaCO_3$, is initially thoroughly dried and blended with a solid or liquid monomer (or, as mentioned, co-monomers or a prepolymer), as for example, by milling of the dry mineral and a dry monomer in a suitable mill, which may also be screened. The resulting powder is thereupon provided in a suitable reactor, which has previously been heated to an intermediate temperature, for example, 100° C. The reactor is flushed with nitrogen, or other inert gas such as argon, to remove residual oxygen and thereupon a flow of hydrogen, carbon monoxide or carbon dioxide (hereinafter termed reactive gas) is substituted for the nitrogen. The reactive gas need not be pure and may contain inert constituents. Heat is then provided to increase the temperature to at least the melting point of the monomer, but insufficient to volatilize the monomer, while the reactive gas atmosphere is maintained. The temperatures are generally under about 350° C., typically being of the order of 150° to 250° C. for representative monomers, or somewhat lower.

The said reaction may be conducted in apparatus which provides good gas-solids contact, such as a rotary furnace. The said reaction may also be conducted in a fluidized bed reactor, with the gaseous components passing upwardly through a suitable diffuser plate, and into a fluidized bed of the particulate material being treated. Typical reaction times are from about 1 to 45 minutes, depending upon concentration and composition of the reactants and temperature, although longer reaction times can be utilized.

If a fluidized bed is used, after the reaction is completed, for example in 25 minutes, the heating source is removed from the reactor and the unit allowed to cool to about 100° C while the reactive gaseous atmosphere is maintained, and thereafter the reactive gas is replaced by a flow of nitrogen, upon which the reactor is allowed to cool down and the product removed When the reducing gas employed is carbon monoxide, the reaction time required for completion of the reaction is substantially shorter than when $H_2$ is employed (i.e., 5 minutes versus 45 minutes).

The product of the invention is found to be, e.g., a layered lattice silicate such as kaolin or talc, or a metal carbonate such as $CaCO_3$, which is surface bound to the polymerized organic. When the product is used in typical filler applications, it yields excellent improvements in the mechanical and other useful properties of the filled system.

It is known that glass fibers are used commercially to produce fabrics and insulation. When the starting material in this invention is glass fibers, they may be used as subdivided fibers, as the fibers themselves or as yarn or textiles comprising the glass fibers, for carrying out the surface treatment according to the invention.

Thus, it has now been found that with the use of hydrogen or CO or $CO_2$, an effective, strong bonding of modifier to the mineral surface is achieved. Meta-cresol extraction of the modified minerals has confirmed the strong bonding at the surface (the surface nylons were not removed by extraction in m-cresol for 2 hours).

Various layered lattice silicates, including minerals comprising same, may be treated by the method of the invention. Thus, for example, clays of the halloysite, illite, kaolinite, montmorillonite, palygorskite groups, talc and various other clays, glass fibers and $CaCO_3$, can be readily treated by the present invention. Calcined or hydrous, e.g., uncalcined kaolins, may be employed.

With respect to kaolin teminology, it is noted that the prior art literature, including numerous of the prior art patents relating to the field of kaolin products and processing, commonly uses the term "hydrous" to refer to a kaolin which has not been subjected to calcination — more specifically, which has not been subjected to temperatures above about 450° C., which temperatures serve to alter the basic crystal structure of kaolin. These so-called "hydrous" clays may have been produced from crude kaolins, which have been subjected to beneficiation, as, for example, to froth flotation, to magnetic separation, to mechanical delamination, grinding, or similar comminution, but not to the mentioned heating as would impair the crystal structure. The description of these materials as "hydrous" is actually somewhat inaccurate since there is no molecular water actually present in the kaolinite structure. Thus, although the composition can be (and often is) arbitrarily written in the form $2H_2O \cdot Al_2O_3 \cdot 2SiO_2$, it is now well-known that kaolinite is an aluminum hydroxide silicate of approximate composition $Al_2(OH)_4Si_2O_5$ (which equates to the hydrated formula just cited). Once the kaolin is subjected to calcination, which, for the purposes of this specification means being subjected to heating of 450° C. or higher for a period which eliminates the hydroxyl groups, the crystalline structure of the kaolinite is destroyed. In any event, in order to maintain consistency with the prior art terminology, the terms "hydrous kaolin" and "calcined kaolins" are used in this specification in the commonly understood prior art senses just indicated.

However, where hydrous kaolins are treated which have been subjected to aqueous processing with dispersants, a problem that arises is that the dispersing agent covers the active sites resulting from the use of reactive gas, e.g., hydrogen, CO, and renders the kaolin inactive. In that case a polymerization initiation catalyst is needed, where polymerization occurs from monomers, viz., a minor amount, generally less than 1%, e.g., of the order of 0.25 to 0.5 weight percent based on the weight of the hydrous kaolin on a dry basis, of a calcined kaolin or titanium dioxide, the calcined kaolin being preferred.

A large variety of organic monomers may be used in the process of the invention; for example E-caprolactam or alternatively 6-amino caproic acid, to produce nylon 6; hexamethylene-diammonium adipate or the co-monomers hexamethylene diamine and adipic acid, to form nylon 6,6; the corresponding monomer from hexamethylene diamine and sebacic acid or the co-monomers, to form nylon 6,10; and the lactam of heptanoic acid to form nylon 7. It will be apparent that other monomers, co-monomers or prepolymers may be used to produce various nylon types. In addition, other types of prepolymers, e.g., ABS (acrylonitrile/butadiene/styrene) prepolymer, hydrocarbon prepolymers such as polybutadiene, polypropylene, polyethylene, are capable of being reacted in situ on the mineral, to make the latter useful as fillers for polymer matrices, in particular matrices of the same polymer as that deposited on the layered lattice silicate particles. Similarly, the in situ formed polymer need not be identical to the matrix polymer, provided that the two are compatible. It is believed that the polyamide (nylon) type polymers grow from the surface of the mineral which results from the exposure of the mineral surface to nylon type monomers/prepolymers; and that in the case of the other resins (ABS prepolymer, polybutadiene, polypropylene, polyethylene) the polymer resin is exposed to the mineral surface and becomes bonded to it.

Thus, the invention includes the in situ synthesis of polymers on a layered lattice silicate surface with the primary, i.e. first layers being surface bonded (which are not removed by meta-cresal or formic acid extractions); and as a product, a particulate layered lattice silicate comprising particles of the silicate the surfaces of which are modified by the in situ synthesized polymer.

BRIEF DESCRIPTION OF THE DRAWINGS

In the drawings:

FIG. 7 shows a reference infrared spectra from the above cited *Aldrich Library*, for acrylonitrile/butadiene/styrene (ABS) resin beads;

FIG. 8 shows an infrared drift spectra for a sample of an air classified kaolin reacted in accordance with the invention with 5% by weight of an ABS prepolymer;

DETAILED DESCRIPTION

The invention will now be illustrated by the Examples, which, however, are to be considered as merely exemplary of the practice of the invention, and not as delimitive thereof.

In connection with the Examples, certain compounds with their formulas, which are interrelated, are shown below:

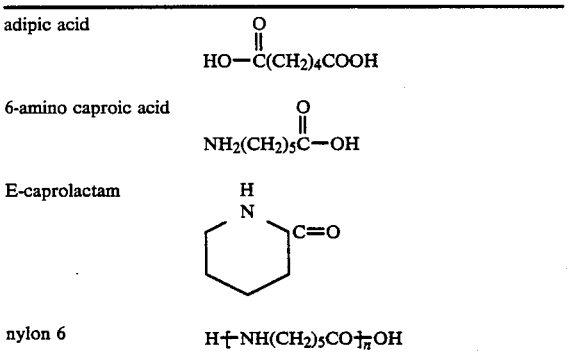

adipic acid $$HO-\overset{\overset{O}{\|}}{C}(CH_2)_4COOH$$

6-amino caproic acid $$NH_2(CH_2)_5\overset{\overset{O}{\|}}{C}-OH$$

E-caprolactam nylon 6

$$H\text{-}[NH(CH_2)_5CO]_n\text{-}OH$$

| | |
|---|---|
| nylon 6,6 |  H―[NH(CH₂)₆NHCO(CH₂)₄CO]ₙ―OH |

EXAMPLE 1

This Example illustrates the procedure involved in preparation of a typical surface-modified filler pigment pursuant to the invention.

The starting material for this Example was a commercially available calcined kaolin, viz., the calcined kaolin product Alphatex ® of Anglo-American Clays Corporation (Sandersville, Ga.), which product is further described in U.S. Pat. No. 4,386,948. This material, in thoroughly dry form, was blended with a solid monomer. In this instance, the monomer was 6-amino caproic acid ("6 ACA"), which was milled with the dry kaolin in a Micropulverizer ® mill and screened during milling. The screen had a mesh opening of 0.0067 inches. The 6 ACA was mixed during milling at 2.5% by weight of the kaolin. After the material was thoroughly milled and screened, it appeared as a uniform powder. A pound of the said powder was placed in a fluidized bed reactor that had previously been heated to a temperature of approximately 100° C. The reactor was flushed with nitrogen to remove residual oxygen. Thereupon, a flow of hydrogen was introduced by switching the flow of nitrogen to hydrogen. The temperature was then increased to approximately 250° to 265° C. This temperature was maintained for approximately 25 minutes while the hydrogen atmosphere was maintained; and thereafter the hydrogen was replaced by a flow of nitrogen, after which the unit was allowed to cool down and the product removed for testing.

Figure 1:
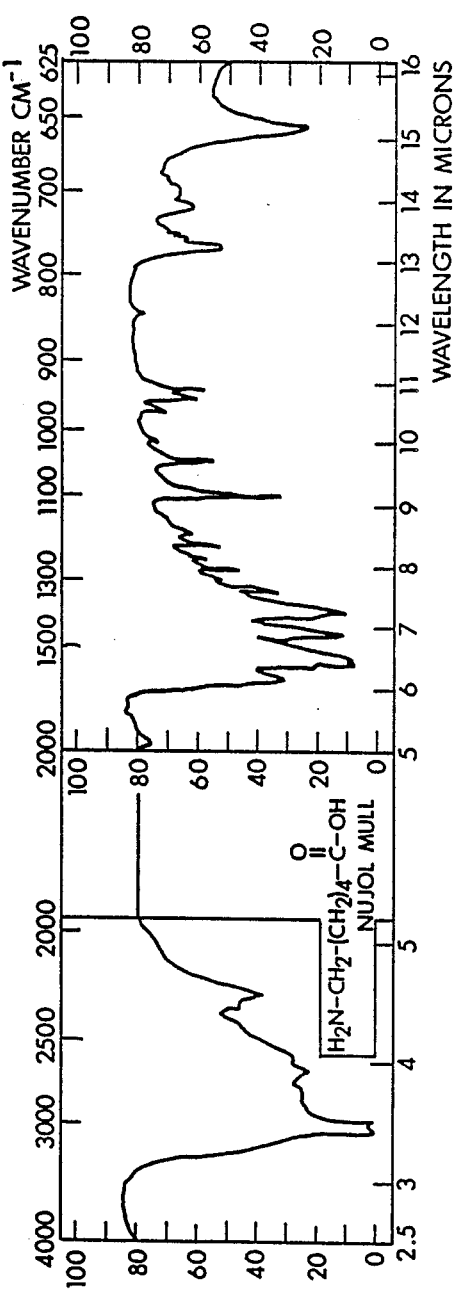
FIG. 1 shows a reference infrared spectra known in the literature (taken from the *Aldrich Library of Infrared Spectra*) of 6-aminocaproic acid.
Figure 2:
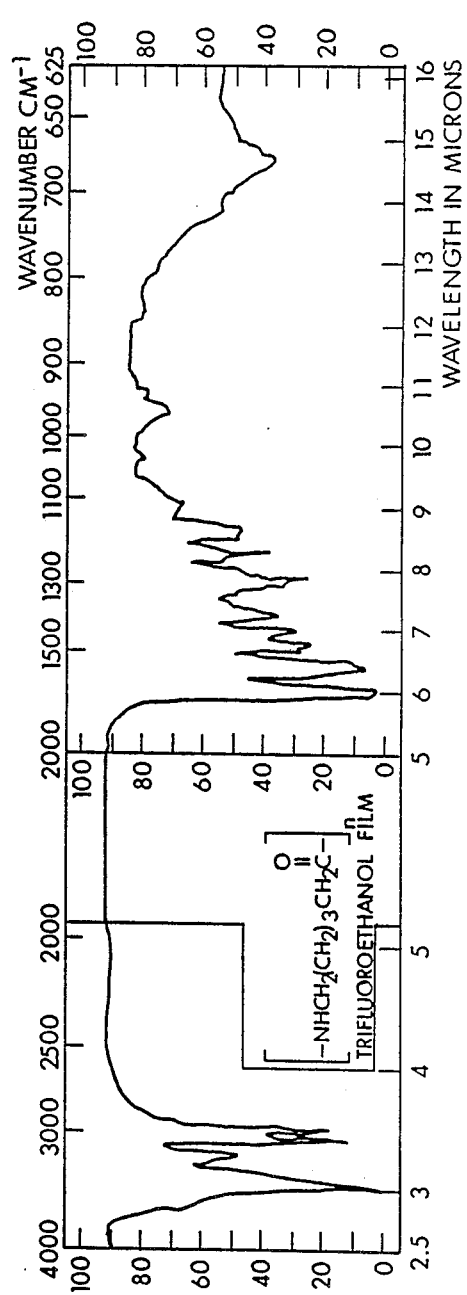
FIG. 2 shows a reference infrared spectra from the cited *Aldrich Library*, for nylon 6 [poly(caprolactam)] pellets.
Figure 3:
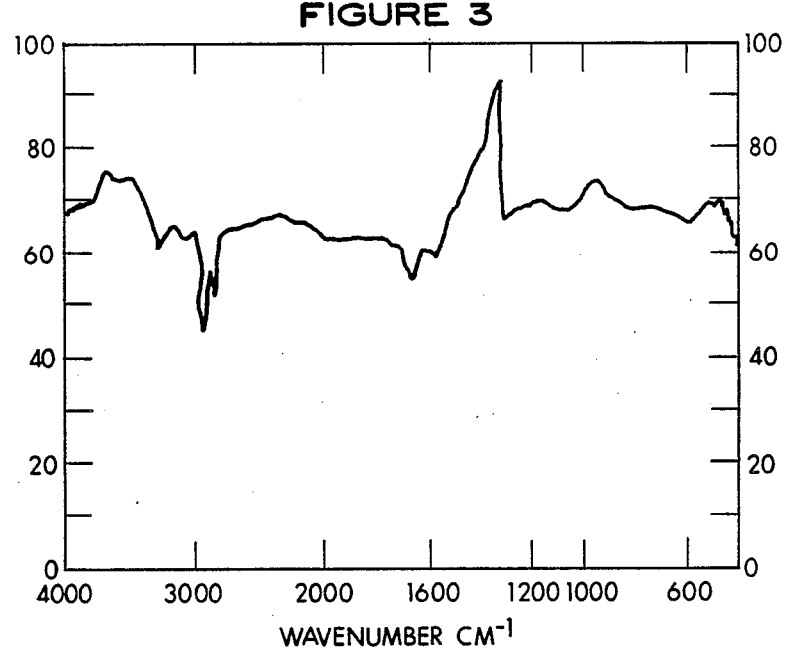
FIG. 3 shows an infrared drift spectra for a sample of a calcined kaolin reacted in accordance with the invention with 2.5% by weight of 6-aminocaproic acid.

Drift infrared spectra were obtained on a Perkin-Elmer 1710 F.T. infrared spectrophotometer fitted with a diffuse reflectance attachment, and are set forth in FIG. 3. The base kaolin has been subtracted from this spectra to enable one to monitor the surface organic treatment without interference of the base kaolin. (Comparison should be made to the reference spectra of FIGS. 1 and 2). IR bands in the spectra showed the following: A shift can be noted in the 1575 cm$^{-1}$ band which is shifted approximately 50 cm$^{-1}$ toward a higher wave number, and in addition there is a broadening observed in the 1640 cm$^{-1}$ band; and further seen is a disappearance of the 3300–3400 cm$^{-1}$ band due to the NH stretch. This all indicates that the molecule of the 6 ACA has bonded to the surface of the kaolin. Also to be noted is that small bands are appearing at 3300 and 3080 cm$^{-1}$, which are indicative of polymerization and nylon formation.

EXAMPLE 2

Figure 4:
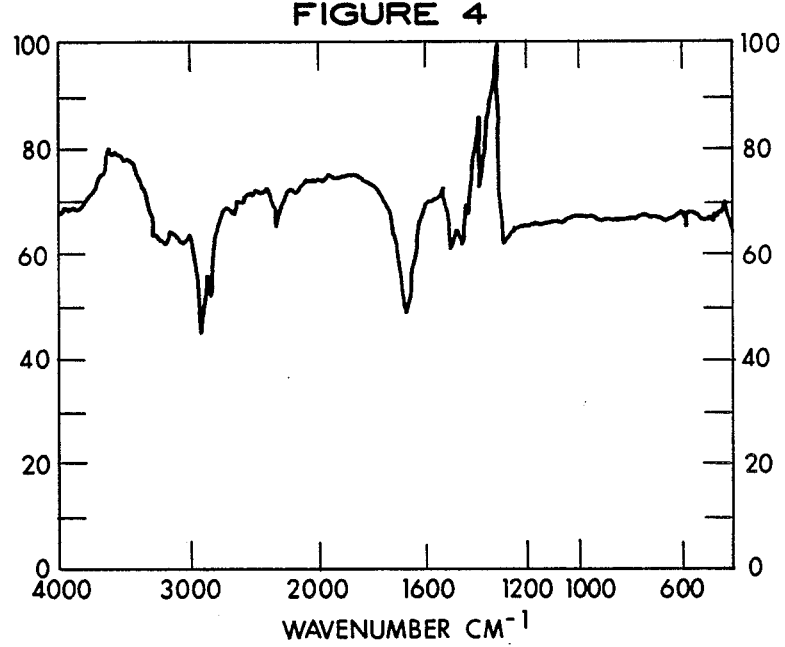
FIG. 4 shows an infrared drift spectra for a sample of a calcined kaolin reacted in accordance with the invention with a 1% water and 5% caprolactam composition.

The procedure utilized in this example was substantially identical to that used in Example 1, except that the starting material for the treatment by the process of the invention was a further commercially available calcined kaolin, the Whitetex ® product of Freeport Kaolin, which is a so-called "PRP" (paper, rubber, plastic) grade of calcined kaolin, i.e. a somewhat coarser kaolin having an average particle size of approximately 70% by weight less than 2 microns equivalent spherical diameter (E.S.D.). Further, in this Example, the treating composition was 1% water and 5% caprolactam. Following the preparation of the monomer/kaolin mixture by the procedure as in Example 1, the treatment in the reactor was identical as described in Example 1, except that a temperature of 190° C. was used; and after such treatment, infrared drift spectra were obtained for the sample and are set forth in FIG. 4. The spectra in FIG. 4 should be compared with those in FIG. 2, which is a reference infrared spectra for nylon 6. It will be evident by such comparison that the polymerized nylon 6 has been achieved at the surface of the kaolin.

EXAMPLE 3

Figure 5:
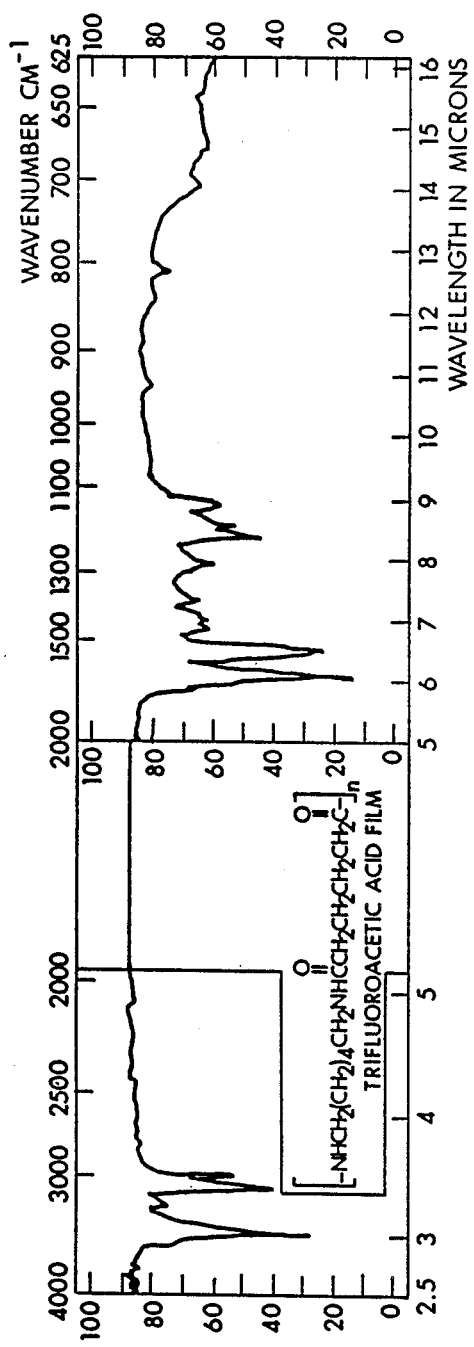
FIG. 5 shows a reference infrared spectra from the above cited *Aldrich Library*, for nylon 6,6 [poly(hexamethylene adipamide)] pellets.
Figure 6:
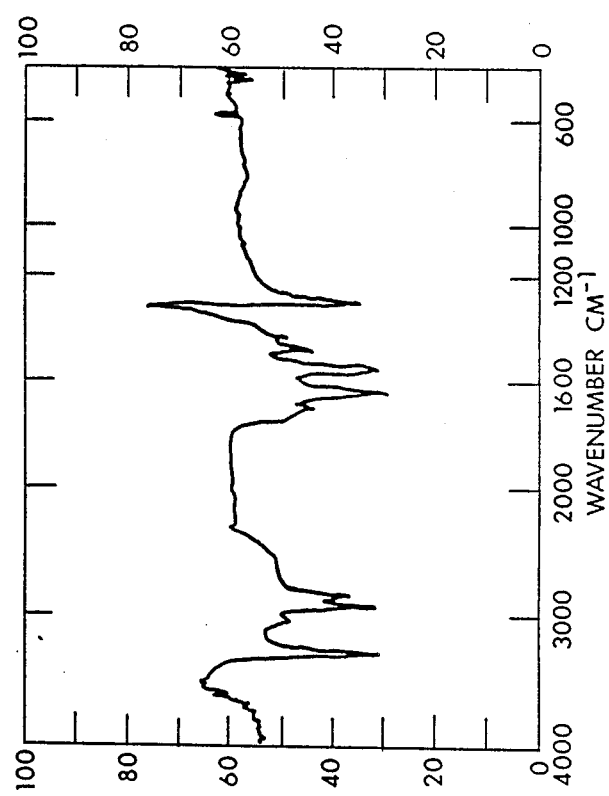
FIG. 6 shows an infrared drift spectra for a sample of a calcined kaolin reacted in accordance with the invention, with 3% by weight adipic acid plus 2.6% 1,6 diaminohexane.

The procedure utilized in this Example was substantially identical to that set forth in Example 2, and the starting material was the Whitetex ® calcined product aforementioned. However, the co-monomers in this instance comprised 3.0% adipic acid together with 2.6% by weight of 1,6 diaminohexane. Following the treatment as set forth in Examples 1 and 2, (but utilizing a reaction temperature of approximately 280° C), the drift spectra were obtained for the product and were compared to those of nylon 6,6 which appear in FIG. 5. The drift spectra of the samples are seen in FIG. 6, and it will be evident again that polymerization upon the surface of the calcined kaolin has occurred to produce nylon 6,6.

EXAMPLE 4

In this Example, a further kaolin was utilized, namely an uncalcined or, as it is sometimes referred to in the art, a "hydrous" kaolin, the material being an air-classified product having a particle size distribution such that 82% by weight of the particles were of less than 2 micrometers E.S.D.; and having a surface area of 20 m²/g. The reactant in this instance comprised 5% by weight of an ABS (acrylonitrile/butadiene/styrene) prepolymer. This was the resin of high butadiene content, product of Aldrich (#18,088-2). The procedure used during treatment was as described in connection with the prior Examples (except reaction temperature was 275° C.); and following such preparation, the resultant surface-modified samples were subjected to analysis to provide the infrared drift spectra as aforementioned. The resulting spectra are set forth in FIG. 8, which may be compared with FIG. 7, wherein a reference infrared spectra appears for ABS resin beads.

EXAMPLE 5

In this Example, three further types of starting materials were utilized and subjected to the process of the invention. Specifically utilized were a Silver Bow ® talc obtained from Pentech; a white bentonite, i.e. the Bentolite ® L product of Southern Clay Products Company of Gonzales, Texas; and a mica, which was separated from micaceous clays including over 35% mica. The said mica was of the muscovite species, i.e. it was dioctahedral in form. The procedures used were otherwise those of Example 1, i.e. the monomer was 6-aminocaproic acid utilized at 2.5% by weight addition level. In each instance, following treatment with hydrogen, the resulting treated samples were tested by obtaining infrared drift spectra, and it was found that surface polymerization upon each of the samples had occurred as described in connection with the prior Examples. Samples were obtained using as initial starting materials both uncalcined dry particulates, and calcined particulates; and in each instance the resultant final products displayed similar surface polymerization.

EXAMPLE 6

The surface-modified products of the present invention are particularly useful as fillers in plastic, rubber and resin systems and the like, wherein by virtue of their unique compatibility enabled with such systems, excellent mechanical, thermal and other properties are enabled in the thereby filled systems. Accordingly, and in order to demonstrate this facet of the invention, a series of products prepared by the procedures described in the foregoing Examples were evaluated in a filled system. In these instances the prepared products were used as a 40% by weight filler in a nylon system, namely in Vydyne 21X, which is a nylon 6,6. This product is available from Monsanto and is normally commercially filled with a mineral filler at the 40% level.

Melt mixing with nylon resins can conveniently be achieved by method of extrusion (single or twin-screw) injection molding, milling and the like.

The mixing with the nylon was by processing in a twin screw extruder, followed by injection molding. The procedures in injection molding were standard with respect to the nylon molding procedures. The resultant material were tested with respect to tensile strength, modulus, and heat deflection at 264 psi, as shown in Table I below.

TABLE I

Mechanical Properties of Filled Systems According to the Invention vs Standard Nylon System

| Filler | Tensile psi | Flex psi | Flex Modulus $\times 10^5$ psi | Izod ft. lbs. | HDT $^0C$ |
|---|---|---|---|---|---|
| MR409* | 11,504 | 18,700 | 8.1 | .82 | 158 |
| TL445** | 12,672 | 19,600 | 8.0 | .83 | 155 |
| ECCA*** | 11,700 | 19,200 | 9.5 | .82 | 153 |

Fillers were employed at a 40% by weight filler level in a nylon 6'6 system.
Samples were compounded on a counterrotating twin screw extruder.
Samples were molded on a 100 ton Reed Injection Molding machine.
All samples tested dry as molded.
*MR409 is a mineral reinforced commercially filled nylon.
**Translink 445 from Engelhard is a 1% amino silane treated kaolin. The kaolin is a fully calcined kaolin, Whitetex.
***The ECCA product, according to the invention, is a 1% 6ACA (6-amino caproic acid) $H_2$ treated Whitetex.

Thus, when the products of this invention are used as a filler in nylon or in other filled systems, there are found increased modulus, an increase in a modulus stiffness, and increase in tensile strength. For example, it will be noted in Table I that the product of the invention shows 100,000 psi advantage in flexular modulus over the commercial products when used to fill a nylon 6,6 system. There is no sacrifice in impact properties as would be expected with this increase in flexular modulus.

The particulate products of the present invention are further characterized in having particle size distributions (P.S.D.'s) which substantially correspond to the unmodified particulate feeds which are used to produce same. Accordingly, the P.S.D. particulate product is predetermined by selecting the input feed P.S.D. to meet the desired P.S.D. in the end product. This is illustrated in the following Example.

EXAMPLE 7

Figure 9:
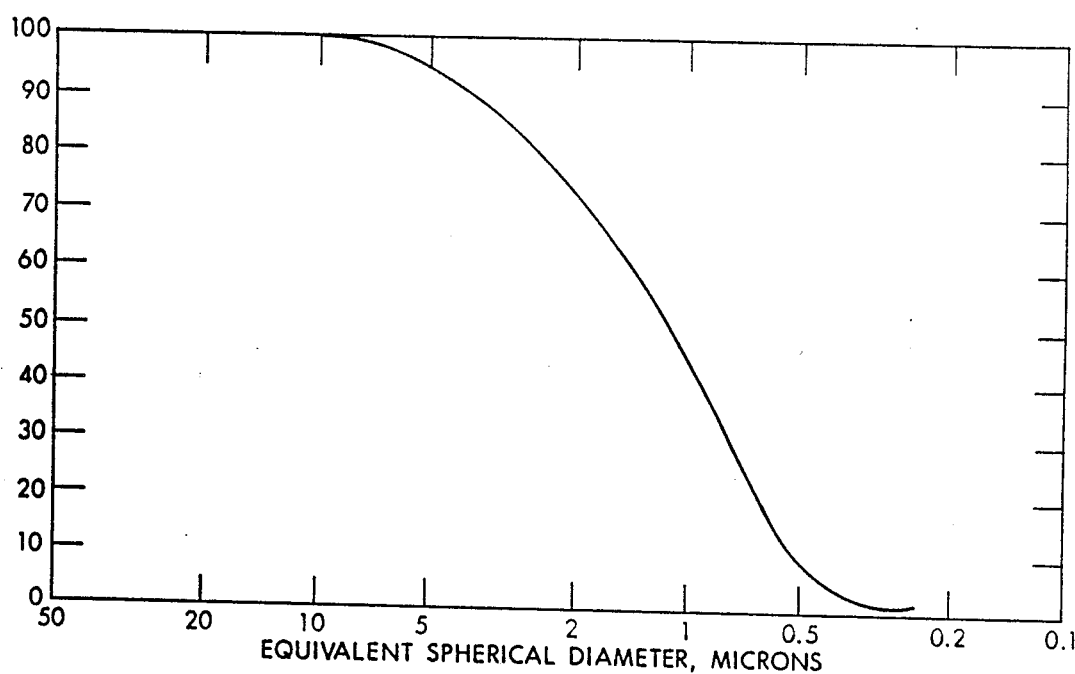
FIG. 9 is a graph, depicting the particle size distribution (P.S.D.) for a calcined kaolin which may be used as a feed for the present invention.
Figure 10:
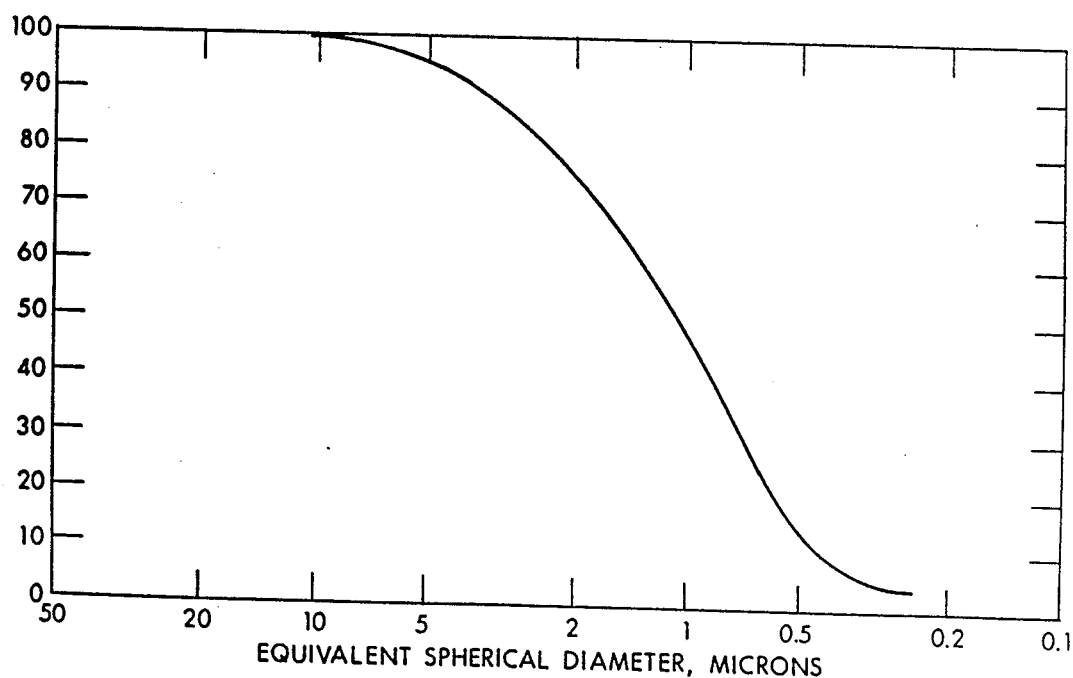
FIG. 10 is a graph of particle size distribution for a product of the invention, which results from use of the input feed shown in FIG. 9.

FIGS. 9 and 10, are graphs depicting P.S.D. (particle size distribution) for two different systems. FIG. 9 shows the P.S.D. for Whitetex, a calcined kaolin, not treated according to the invention, and FIG. 10 shows the P.S.D. for Whitetex treated with 6ACA (6-amino caproic acid) in the presence of hydrogen according to the method of the invention. As can be seen, there is no appreciable difference in P.S.D. between them. One can read from the graphs that the percentage of particles at a given point, e.g., below 1 micron or below 0.5 micron, is essentially the same in the two instances. This result contrasts markedly with certain prior art. For example, in Simone, U.S. Pat. No. 3,912,532, the clay particles become aggregated during the coating operation to go from an average particle size of 1.2 micron to 6 micron; and in Takahashi et al, U.S. Pat. No. 3,773,708, where in the crushing-treating process the particle size diameter is reduced by an average of more than 2 times or by more than 10 times the original diameter. In the subject invention the particle size distribution does not appreciably change.

EXAMPLE 8

The starting material for this example was a commercially available calcined kaolin as described in Example 2 (i.e., Whitetex). The monomers in this instance comprised in total 1.5% by weight comprising 0.75% adipic acid and 0.75% 1,6 hexanediamine (purchased from Aldrich and used without further purification).

These monomers were thoroughly mixed into the calcined kaolin in a Micropulverizer® mill and screened during milling as described in Example 1. The reaction mixture was placed in a storage hopper and screw fed into a rotary furnace operating at 245° C. in a $CO/N_2$ atmosphere. The $CO/N_2$ was passed at 5/15 SCFH flow rate. The material was exposed to the heat and reactive atmosphere for a total of 15 minutes from inlet to outlet.

The product that was removed from the outlet hopper was analyzed by C,N elemental analysis and drift spectroscopy; a 60 gram sample was extracted in m-cresol for 2 hours, washed free of the extract and analyzed by C,N elemental analysis and drift spectroscopy. The m-cresol extract was analyzed via GPC to determine the molecular weight of any nylon produced via this reaction but not bonded directly to the mineral surface.

These data are summarized in Table II. They confirm that the surface layer of nylon is bonded directly to the mineral surface, with subsequent layers merely hydrogen bonded to the surface layer.

The GPC analysis of the m-cresol extract confirmed that a polymerization reaction did indeed take place as a nylon 6,6 polymer of 32,000 molecular weight was produced from its monomers.

Drift analysis of the extracted surface indicated that the surface nylon is bound via the carbonyl group of the amide and not the amine group. (Carbonyl group is shifted 30cm$^{-1}$ down field whereas amine group shows no shift.)

TABLE II

Whitetex + 1.5% (adipic acid + 1,6 hexanediamine) CO/245° C. 15 min.

| Elemental analysis (C,N) | |
|---|---|
| % nylon as reacted | 0.9% |
| % nylon after extraction | 0.6% |
| GPC analysis of m-cresol extract | 32,000 MW |

EXAMPLE 9

A sample of Whitetex® (as described in Example 2) was milled with 2% by weight of a polybutadiene prepolymer. This was the resin of medium molecular weight (about 2000) product of Aldrich. The milled product was divided in half. One half was reacted as described in Example 1 —except that the nitrogen gas was not replaced by a reactive gas such as hydrogen, CO, or $CO_2$. The other half was reacted as described in Example 1, with the inert nitrogen gas being switched to 100% hydrogen after the system had been purged of oxygen.

Figure 11A:
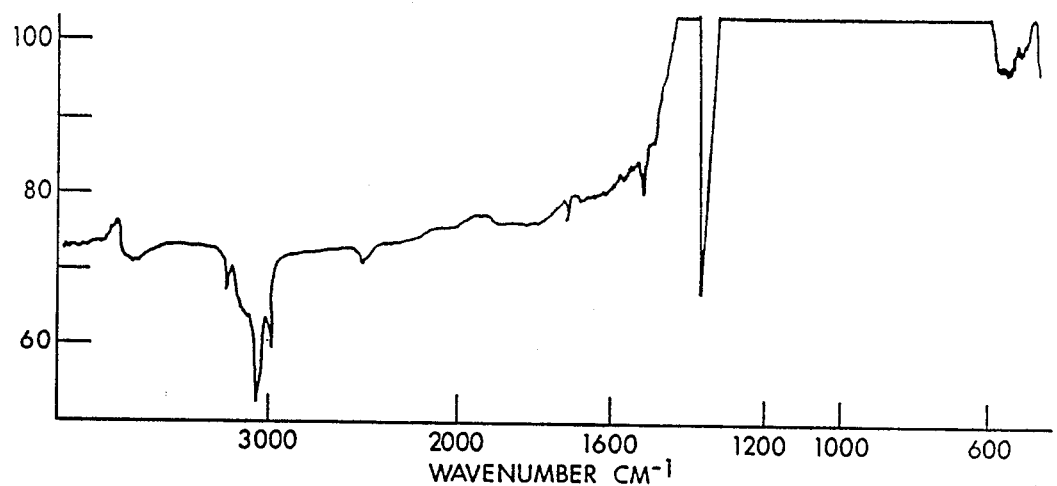
FIG. 11-A, 11-B and 11-C respectively show the results of infrared drift spectroscopy applied to the product of Whitetex milled with 2% by weight of a polybutadiene prepolymer (FIG. 11-A), the product of FIG. 11-A reacted in $N_2$ gas (FIG. 11-B) and the product of FIG. 11-A reacted in $H_2$ gas (FIG. 11-C)
Figure 11B:
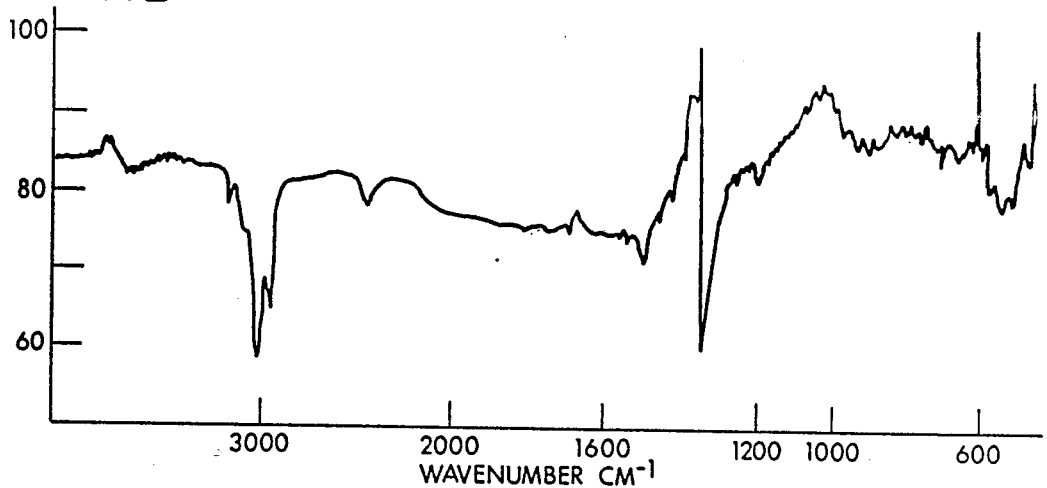
Figure 11C:
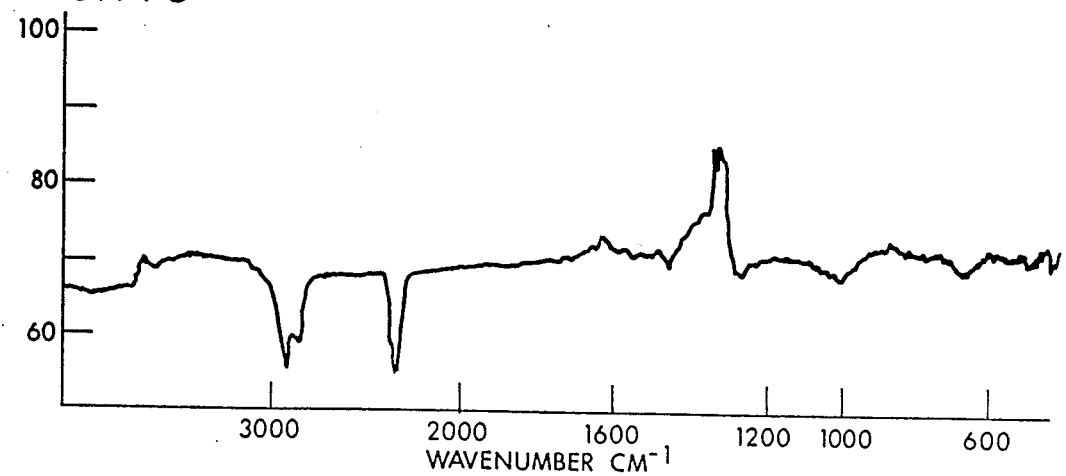

Drift analysis was obtained on the as milled product, A, the $N_2$ only reacted product, B, and the $H_2$ reacted product, C. The results are shown respectively in FIGS. 11-A, 11-B and 11-C. It can clearly be seen from these spectra that the C=C characteristic remains on the A and B products, whereas these bonds (above 3000 $cm^{-1}$) are completely removed by reaction in $H_2$, in the C product.

Extraction studies with a solvent having an appropriate solubility constant, i.e., xylene, were carried out. All of the polymer was removed from samples A and B (as milled product and the sample reacted in only a nitrogen atmosphere). Extraction of the sample reacted in hydrogen left a surface bound layer attached to the mineral surface.

It can be seen that use of the reactive atmosphere comprising hydrogen, has an effect on the product as contrasted with the merely milled Whitetex plus prepolymer and the latter material treated in the presence of nitrogen only. This shows that the treatment with hydrogen according to this invention yields a product which has distinctive surface characteristics that distinguish it from products not treated in a reducing atmosphere, e.g., hydrogen.

EXAMPLE 10

The starting mineral utilized in this reaction was the same as in Example 8, i.e., Whitetex, a calcined kaolin.

Figure 12:
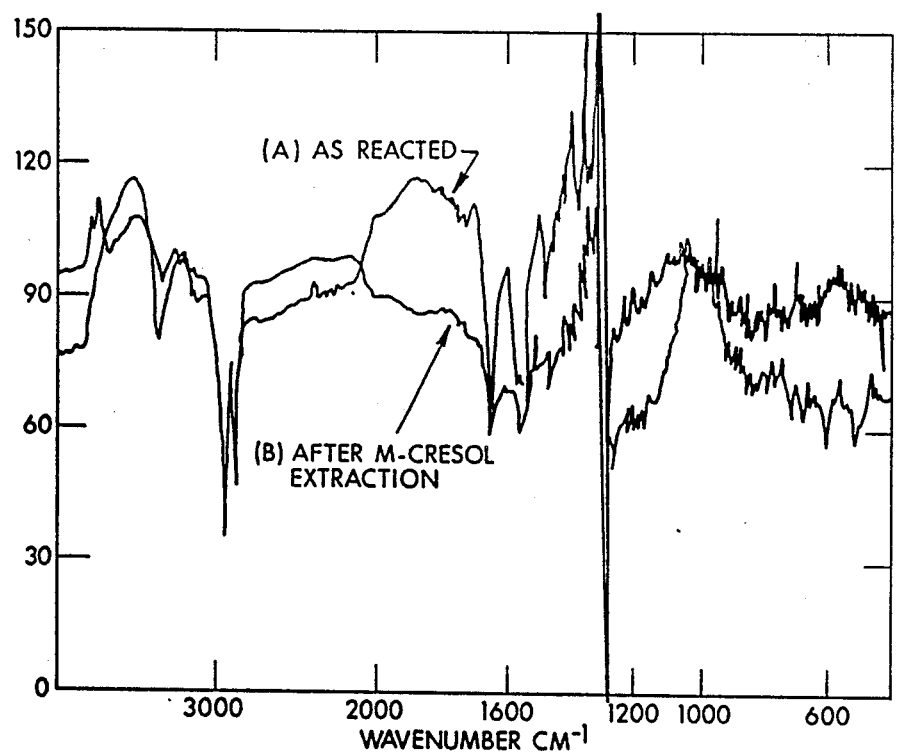
FIG. 12 shows a comparison of infrared drift spectra for a sample of Whitetex treated with 2% 11-aminoundecanoic acid for 45 minutes in 100% $CO_2$ and that sample after extraction with m-cresol for 2 hours.

The dried calcined kaolin was milled in a Micropulverizer ® mill with 2% 11-aminoundecanoic acid. The uniform mixture was placed in a fluidized bed reactor, preheated to 100° C. The reactor was flushed for 2 minutes with nitrogen to exclude any residual oxygen, then the gas was switched to 100% carbon dioxide. The system was heated to 200° C. and reacted for 45 minutes. The heat was removed at the end of the reaction period and the system cooled in $N_2$. The product was removed and analyzed by drift spectroscopy. 60 grams of the surface modified mineral was extracted with m-cresol as described in Example 8. The sample after extraction was also analyzed via drift spectra. The spectra comparison as shown in FIG. 12 illustrates that the surface layer is strongly bound to the mineral surface which shows that $CO_2$ can be used as a reactive atmosphere.

EXAMPLE 11

Figure 13:
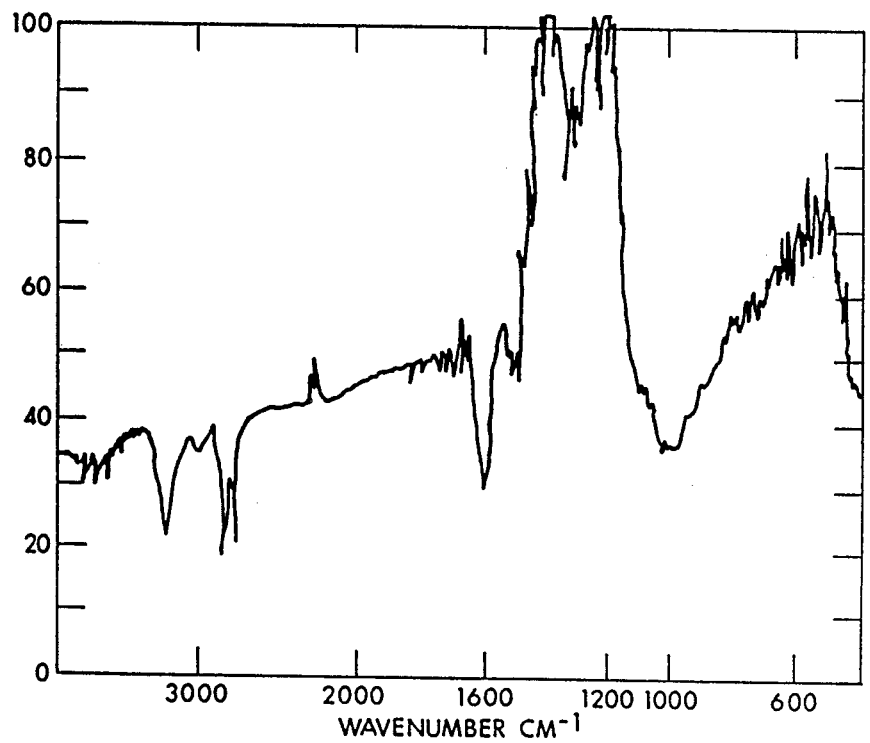
FIG. 13 shows the infrared drift spectra for a sample of chopped glass fibers treated with 11-aminoundecanoic acid in carbon monoxide.

A sample of Dow Corning ® chopped glass fibers was blended with 2% 11-aminoundecanoic acid and reacted in a fluidized bed reactor as described in Example 1. However, the reactive atmosphere employed for this experiment was $CO/N_2$ at a 1:3 ratio; the combined SCFH flow rate was 20. The glass fibers were reacted for 10 minutes at 200° C. The cooled product was analyzed via drift spectra. The spectra revealed the formation of amide 1, II bonds in the 3100–3400 $cm^{-1}$ region in the infrared spectral region as shown in FIG. 13.

EXAMPLE 12

Figure 14:
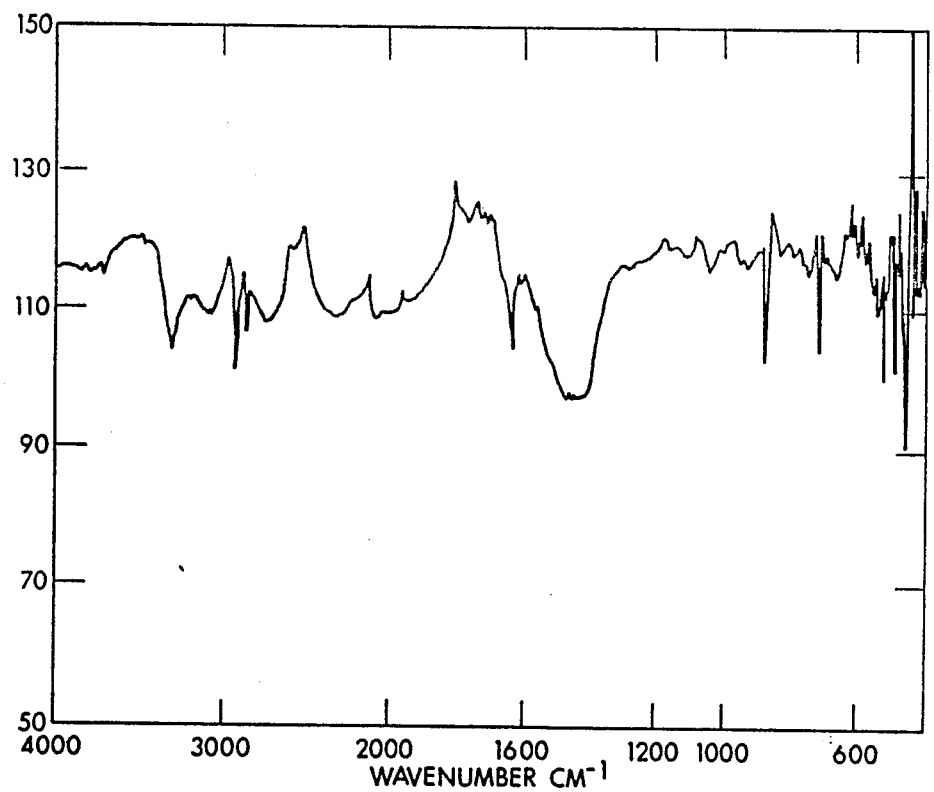
FIG. 14 shows the infrared drift spectra for a sample of Micro-white 50 treated with 11-aminoundecanoic acid in hydrogen.

500 grams of dried Micro-White 50, a dry ground calcium carbonate ground from pure white marble, available from Sylacauga Calcium Products of Sylacauga, Ala., U.S.A., was milled with 2 wt. % 11-aminoundecanoic acid based on the weight of the dry carbonate. The material was processed in a rotary furnace in a hydrogen atmosphere with a hydrogen flow rate of 15 SCFH at 200° C. for 45 minutes. The drift spectra of the reacted product as shown in FIG. 14 exhibited the formaton of amide bonds upon reaction. No catalyst was needed with the dry ground carbonate, the surface of which was not coated with processing chemicals.

EXAMPLE 13

Figure 15:
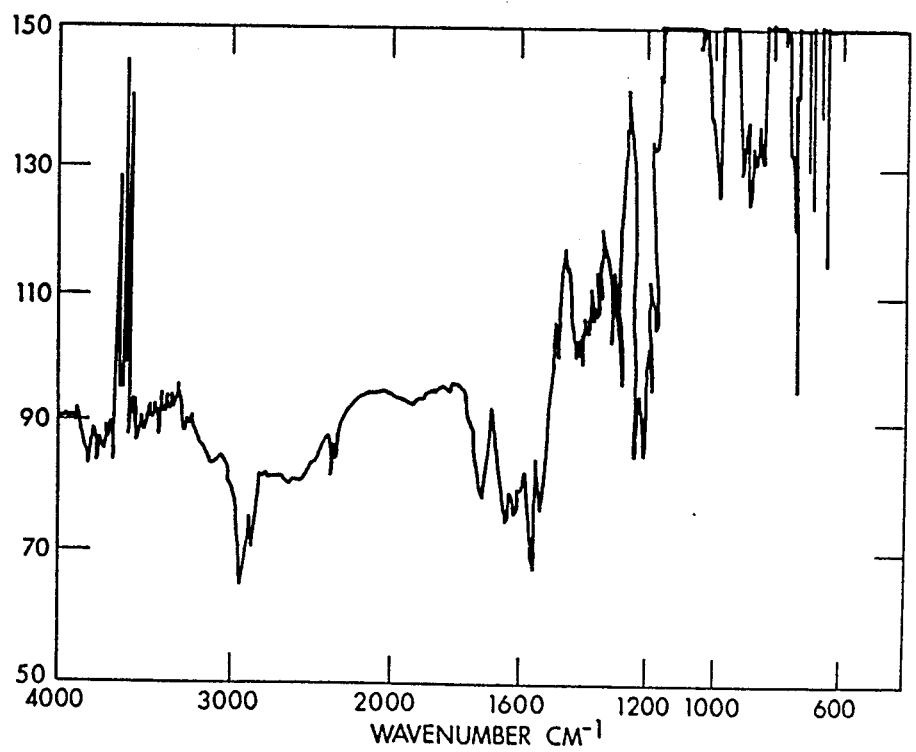
FIG. 15 shows the infrared spectra for a sample of hydrous kaolin treated with adipic acid, hexanediamine and a calcined kaolin catalyst in the presence of carbon monoxide.

200 grams of dried (at 150° C. for 2 hours) hydrous kaolin, having a psd (particle size distribution) of 100% less than 1u, was milled with 0.6% adipic acid, 0.48% hexanediamine and 0.5% Cattex (a calcined kaolin catalyst available from Anglo-American Clays Corporation). The milled kaolin mixture was placed in a vibrating fluidized bed reactor heated to 150° C. The reactor was flushed with $N_2$ gas for 5 minutes to remove oxygen from the system. The temperature of the reactor was increased to 230° C. at which time carbon monoxide was added to the gas flow to achieve a 1:3 mixture of $CO/N_2$; the total flow rate was 15 SCFH. The reaction was allowed to continue for 10 minutes in the $CO/N_2$ environment. At the end of 10 minutes, the CO was discontinued and the reaction vessel cooled to room temperature. The surface treated product was removed and analyzed by infrared spectra analysis for the formation of amide bonds in the 3400 $cm^{-1}$ regions. Both sets were clearly visible, see attached infrared spectra of FIG. 15 and reference nylon spectra of FIG. 5.

In order to assess the nature of the surface, a small sample of the nylon 6,6 treated kaolin product was extracted for 2 hours, with stirring, in metacresol (metacresol will dissolve nylon that is coating the surface but will not remove surface attached/bonded nylon). The product after metacresol extraction was washed with water and oven dried. IR analysis showed a decrease in the amide bonds but a large proportion of the nylon surface was intact. Analysis of the bond position of the carbonyl bond in the surface nylon showed a 20 $cm^{-1}$ shift from the carbonyl bond position of the reference nylon. This shift is indicative of surface bonding of the nylon through the carbonyl group in the amide. No shift was observed for the amine bond.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

I claim:

1. A mineral particulate selected from the group consisting of metal carbonates, glass fibers and layered lattice silicates, comprising particles of said mineral, the surfaces of which have been modified by a polymer synthesized in situ in the presence of a reactive gas selected from the group consisting of hydrogen, carbon monoxide and carbon dioxide; said particulate having a predetermined particle size distribution which substantially corresponds to the particle size distribution of the surface-unmodified feed particulate from which the product particulate is produced.

2. The composition of claim 1 in which the reactive gas is hydrogen.

3. The composition of claim 1 in which the reactive gas is carbon monoxide.

4. The composition of claim 1, in which said layered lattice silicate is a kaolin.

5. The composition of claim 4 in which said kaolin is hydrous and said modified surfaces contain a minor, catalytic amount of a calcined kaolin as polymerization initiation catalyst.

6. The composition of claim 1, in which said layered lattice silicate is a mica.

7. The composition of claim 1, in which said layered lattice silicate is a talc.

8. The composition of claim 1, in which said layered lattice silicate is a bentonite.

9. The composition of claim 1, in which said layered lattice silicate is wollastonite.

10. The composition of claim 1, in which said metal carbonate is calcium carbonate.

11. The composition of claim 1, in which said mineral is glass fibers.

12. The composition of claim 2, in which said mineral is a layered lattice silicate.

13. The composition of claim 3, in which said mineral is a layered lattice silicate.

14. The composition of claim 3, in which said mineral is glass fibers.

15. The composition of claim 3, in which said metal carbonate is calcium carbonate.

16. A composition comprising a filled polymer system comprising a matrix polymer and a filler, said filler comprising a particulate comprising a mineral selected from the group consisting of metal carbonates, glass fibers and layered lattice silicates, the surfaces of the particles of said particulate being modified by a polymer synthesized in situ on the mineral in the presence of a reactive gas selected from the group consisting of hydrogen, carbon monoxide and carbon dioxide; and said particulate having a predetermined particle size distribution which substantially corresponds to the particle size distribution of the surface-unmodified feed particulate from which the product particulate is produced.

17. A composition according to claim 16, in which the in situ synthesized polymer is essentially the same as the matrix polymer.

18. A composition according to claim 16, in which the in situ synthesized polymer is compatible with the matrix polymer.

19. A composition according to claim 16, in which said polymer is a polyamide.

20. A composition according to claim 16, in which the layered lattice silicate is a kaolin.

21. A composition according to claim 16, in which the layered lattice silicate is a mica.

22. A composition according to claim 16, in which the layered lattice silicate is a talc.

23. A composition according to claim 16, in which the layered lattice silicate is a bentonite.

24. A composition according to claim 16, in which the layered lattice silicate is wollastonite.

25. A composition according to claim 16, in which the metal carbonate is calcium carbonate.

26. A composition according to claim 16, in which the mineral is glass fibers.

27. A composition comprising a filled polymer system comprising a matrix polymer and a filler, said filler comprising a particulate comprising a mineral selected from the group consisting of metal carbonates, glass fibers and layered lattice silicates, the surfaces of which have been modified by reacting a prepolymer in situ on the mineral in the presence of a reactive gas selected from the group consisting of hydrogen, carbon monoxide and carbon dioxide; said particulate having a predetermined particle size distribution which substantially corresponds to the particle size distribution of the surface-unmodified feed particulate from which the product particulate is produced.

28. A composition comprising glass fibers, the surfaces of which have been modified by a polymer synthesized in situ or by reacting a prepolymer in situ in the presence of a reactive gas selected from the group consisting of hydrogen, carbon monoxide and carbon dioxide.

29. A method of producing a mineral selected from the group consisting of metal carbonates, glass fibers and layered lattice silicates which is surface modified with an organic material, wherein the mineral is contacted with an organic monomer, co-monomers, or a prepolymer, in the presence of gaseous carbon dioxide.

30. A method in accordance with claim 29 in which said layered lattice silicate is a hydrous kaolin or a calcined kaolin.

31. A method in accordance with claim 29 in which said metal carbonate is calcium carbonate.

* * * * *